United States Patent [19]

Komatsu et al.

[11] 3,955,776
[45] May 11, 1976

[54] AUTOMATIC STOP MECHANISM FOR TAPE RECORDER

[75] Inventors: Fumito Komatsu, Suwa; Akihiko Isaka, Nagano, both of Japan

[73] Assignee: Sankyo Seiki Mfg. Co., Ltd., Tokyo, Japan

[22] Filed: July 2, 1974

[21] Appl. No.: 485,314

[30] Foreign Application Priority Data

July 5, 1973 Japan .................. 48-76402

[52] U.S. Cl. .................... 242/191; 360/74
[51] Int. Cl.² ............... B65H 59/38; G03B 1/02; G11B 15/32
[58] Field of Search ............ 242/191, 186; 360/74

[56] References Cited
UNITED STATES PATENTS

| | | | |
|---|---|---|---|
| 3,480,230 | 11/1969 | Hosono et al. | 242/191 |
| 3,563,493 | 2/1971 | Bielke | 242/186 |
| 3,637,163 | 1/1972 | Apitz | 242/191 |
| 3,653,607 | 4/1972 | Lambeek et al. | 242/191 |
| 3,759,463 | 9/1973 | Yoshii | 242/146 |

*Primary Examiner*—Leonard D. Christian
*Attorney, Agent, or Firm*—Haseltine, Lake & Waters

[57] ABSTRACT

Automatic stop mechanism for an electronic tape apparatus such as a tape recorder. The stop mechanism operates mechanically and comprises a driven rotor or disc, a sensing wheel cup mounted on the disc, and an operating lever kicking out an unlocking means of the tape recorder in order to cut an electric driving source. When voltage of the source is lowered, the operating lever effectively operates by means of a centrifugal clutch mechanism contacting with the sensing or detecting wheel cup. The clutch mechanism suitably cuts rotation communication between the driven rotor and a reel disc.

7 Claims, 33 Drawing Figures

FIG. I

FIG. 32
FIG. 33
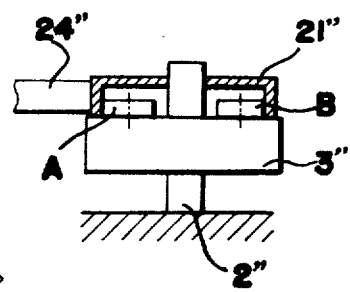
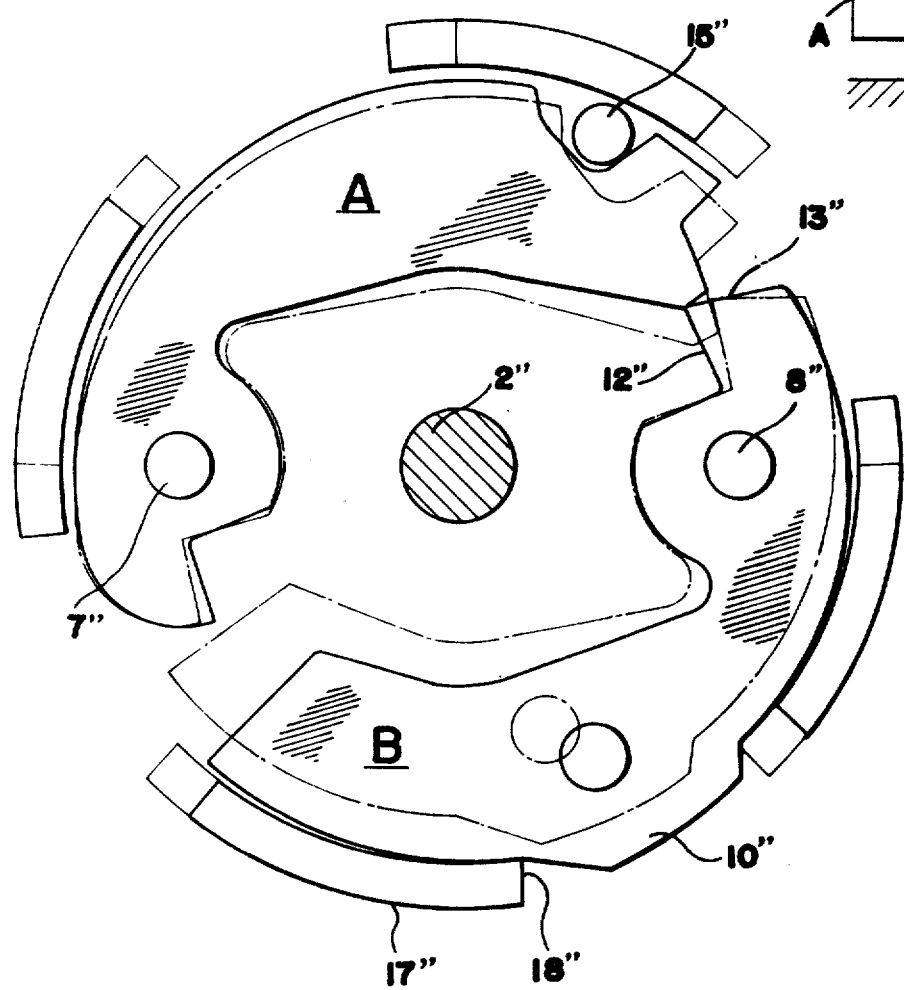

AUTOMATIC STOP MECHANISM FOR TAPE RECORDER

BACKGROUND OF THE INVENTION

1. Field of the invention

The present invention is concerned with an automatic stop mechanism for an electronic tape apparatus and a centrifugal clutch mechanism for effectively operating the stop mechanism when the voltage of an electric source is lowered.

2. Description of the prior art

According to the prior art, such automatic stop mechanism generally comprises a sensing means for detecting when a tape is stopped and an unlocking means for unlocking a mechanism blocking the running condition of the tape. Nowadays, there are many kinds of the sensing means or system for example, A. A tape tension system using tape tension developed in a tape running between reels when it is stopped. The strained condition of the tape is detected by a detector placed along the tape's passage and pressed by the tape.

B. A sensor system using a photoelectric sensing means or a physical sensing device in order to detect or place a marking formed on an end of a tape.

C. A rotational difference system using a rotating wheel contacting a reel. When the reel is stopped, an unlocking lever having a roller is drawn into a place between the stopped reel and the rotating wheel owing to the rotational difference between them.

They have specific shortcomings and the present invention seeks to resolve these shortcomings of the prior art.

OBJECTS OF THE INVENTION

It is, therefore, a primary object of the present invention to provide a novel automatic stop device employed in an electronic tape apparatus, comprising a rotor driven by a prime mover, a sensing means mounted on the rotor so as to contact a tape reel or an idler, and an operating means or lever for kicking out an unlocking mechanism of the locker of the tape apparatus.

Another object of the present invention is to provide a compact stop device using a fly-wheel mounted inherently on the tape recorder, and an operating lever mounted within the space of the driven rotor.

Still another object is to provide a useful stop device having the operating lever, which lever is formed with a projection adapted to project when the stopped condition of the reel is detected so as to stop the tape recorder.

Still another object is to provide an effective automatic stop mechanism of, for example, a tape recorder having a fly-wheel whose rotational inertia is used to actuate the unlocking mechanism.

Still another object is to provide an automatic stop system for a tape recorder, which system includes a stop mechanism of a driven rotor, a sensing wheel and a kicker, and a centrifugal clutch mechanism contacting the sensing wheel.

Still another object is to provide a stop system adapted to automatically and effectively operate even if the voltage of an electric source is lowered by means of a centrifugal clutch device.

Other objects, features and advantages of the present invention will become apparent from the following detailed description when taken in conjunction with the accompanying drawings.

BRIEF DESCRIPTION OF THE DRAWINGS

FIG. 32 is a diagrammatic plan view showing the operation of the idler of FIG. 30.

FIG. 33 is a modified embodiment of the clutch device shown in FIGS. 30 - 32.

DETAILED EXPLANATION OF THE PREFERRED EMBODIMENTS

Figure 1:
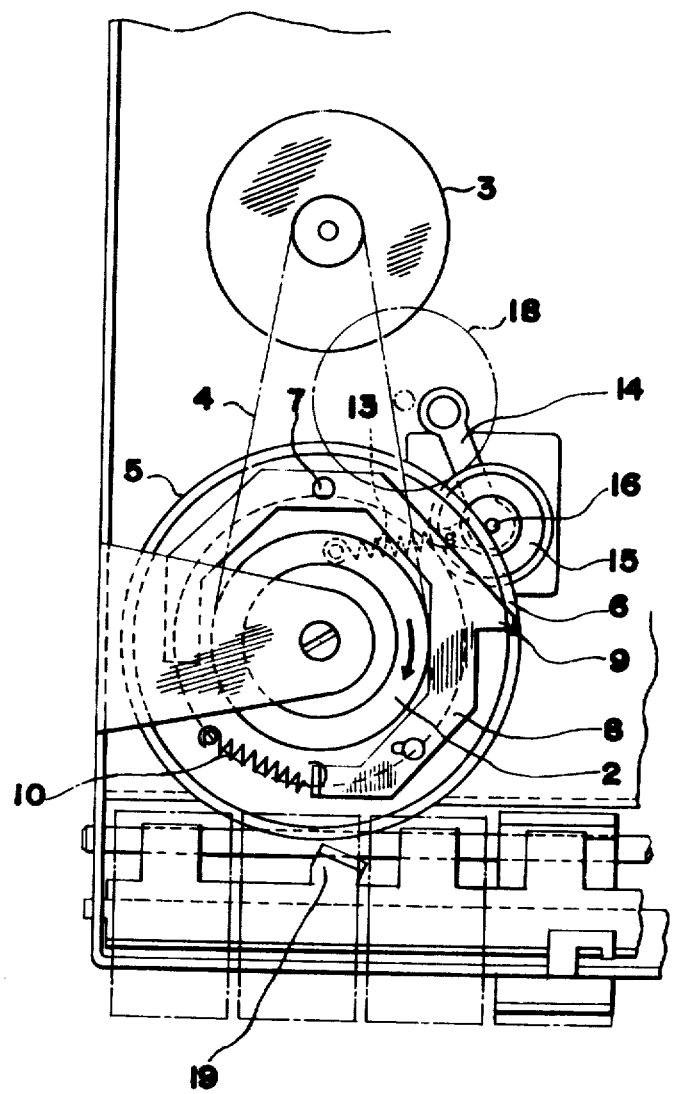
FIG. 1 is a rear view of the automatic stop device according to the invention.
Figure 2:
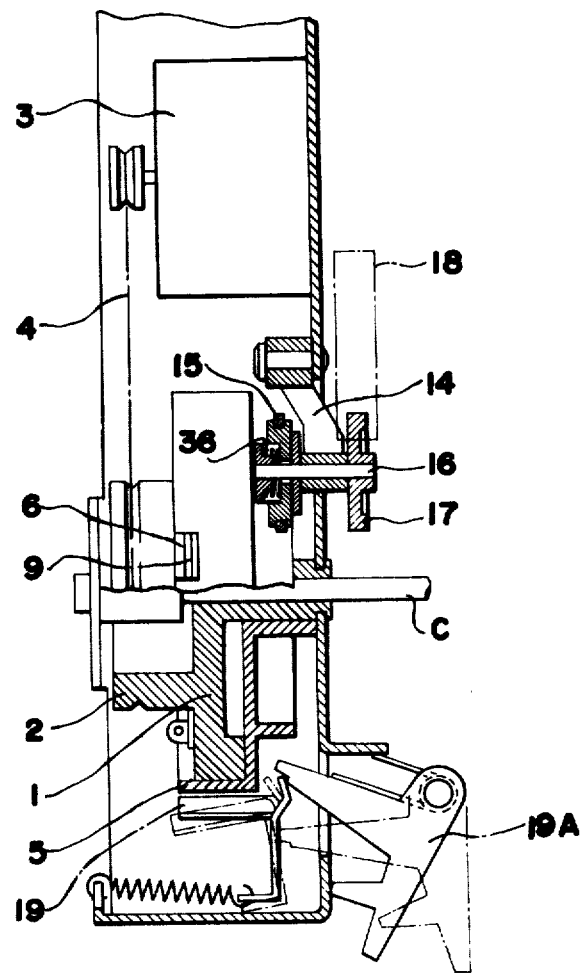
FIG. 2 is a side view partly broken away in section of the first embodiment shown in FIG. 1.
Figure 3:
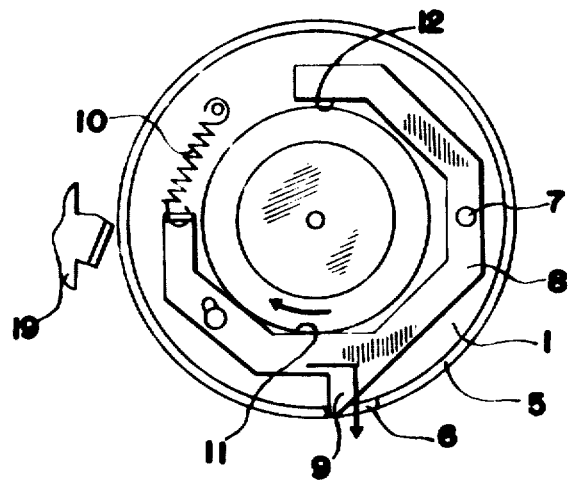
FIGS. 3 and 4 are detailed views which show the operation of the stop device.

Referring first to the first embodiments of the present invention shown in FIGS. 1 – 4 inclusive, an automatic stop device for a tape recorder comprises generally a driving motor 3, a driven rotor 1 and a tape reel 18. The driven rotor 1 as a flywheel is mounted on a frame of the tape recorder through a capstan shaft C and driven by the electric motor 3 through a pulley 2 formed on the rotor 1 and a belt 4 for communicating rotating force from the motor to the rotor.

A sensing wheel 5 is rotatably positioned on the driven rotor 1. The sensing wheel 5 is made as a cup-shaped body and formed with a window 6 on its flange portion. An unlocking lever 8 having a protrusion 9 is placed on a sideface of the driven rotor 1 is rotatably mounted on the driven rotor 1 by means of a fulcrum 7. The lever 8 is biassed around the fulcrum 7 by means of a spring 10 secured to an end portion of the lever 8. When the unlocking lever 8 is urged to rotate toward a center of the driven rotor 1, the projection or protrusion 9 projects through the window 6 formed on the flange portion. The lever 8 is restricted in its projecting movement by contacting restriction edges 11 and 12 formed on the lever 8 with a boss of the driven rotor 1.

An idler 15 contacts the sensing wheel 5 through a secondary flanged portion projecting rearwardly from a primary flanged portion contacting the driven rotor 1. The idler 15 is formed integrally with an arm 14 having an end secured to the machine frame and the other end pulled toward the driven rotor 1. The idler 15 is frictionally connected to a rotating shaft 16 by means of a coil spring 36 placed between the rotating shaft 16 and the idler 15. A transmitting or communicating wheel 17 fixed coaxially with the rotating shaft 16 abuts against the tape reel disc 18 in order to rotate the reel. The wheel 17 is rotatable and in circumferential contact with either one of the two reel discs 18. It will be understood that the reel discs 18 respectively have central hubs to interfit with central openings of tape reels of a cassette to drive such reels.

A locking member 19 is provided for locking the unlocking mechanism such as a press button. The locking member 19 is placed near the periphery of the driven rotor 1 and when the protrusion 9 is projected through the window 6 out of the periphery of the rotor 1 during the rotor's rotation the projection 9 strikes the locking member 19 so as to unlock the unlocking mechanism and stop the electric motor 3.

The automatic stop operation of the mechanism according to the present invention will be described hereinbelow with respect to the operational mechanism of a tape recorder shown in the drawings. The tape reel 18 seen in FIG. 1 is adapted to be rotated by means of the driven rotor 1. When a push button is operated to energize the motor 3 and to rotate the driven rotor 1, a rotational motion or force of the driven rotor 1 is transmitted to a rotation transmitting wheel 17 through the idler 15 which is in contact with the rotor 1 and coaxially mounted on the wheel 17. Finally, the rotation transmitting wheel 17 rotates the tape reel 18 in order to wind-up and wind-back a tape.

In the ordinary condition in which a tape is running around the reel, the protrusion 9 of the unlocking means or lever 8 engages with an end edge of the window 6 formed on the sensing wheel 5 and does not protrude out of the outer periphery of the sensing wheel 5. The positional relation between the sensing wheel and the lever is kept by means of the coil spring 10 and the restriction edges 11 and 12. Thus, the sensing wheel 5 is driven and rotates together with the driven rotor 1.

Figure 4:
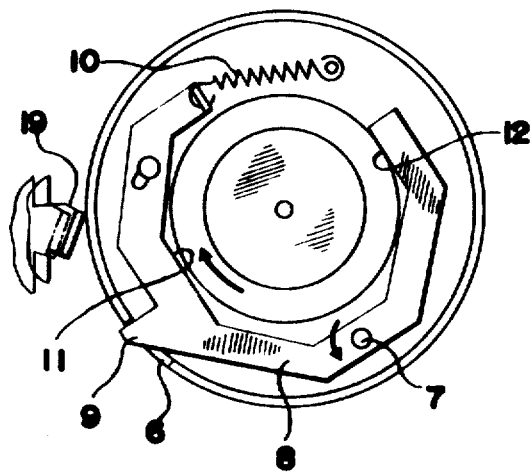

Upon completion of a winding operation, the tape is stretched taut by the tension created therein at the end of its travel, with the result that the reel disc 18 is subjected to a braking force to cease its rotation. Then, the wheel 17 is under the braked condition to apply the braking force to the idler pulley 15 which is in frictional contact with the wheel 17, whereby the sensing means 5 is subjected to a braking load which can overcome the rotational force of the driven rotor 1 to undergo relative angular movement with respect thereto. Then, overload is necessarily applied to the sensing wheel 5 and a difference in speeds between the sensing wheel and the driven rotor 1 running at high speed is produced. In this condition, an end edge of the window 6 formed in the sensing wheel pushes the protrusion 9 of the unlocking lever 8 in order to rotate or swing it clockwise around the shaft 7, whereby the protrusion 9 protrudes out of the sensing wheel as shown in FIG. 4 and consequently the protrusion 9 strikes a locking member 19 so as to remove it from its ordinary position where the motor is stopped. During the striking the unlocking lever 8 returns to its original position in which the protrusion 9 is placed within a surface area of the driven rotor 1 by means of the force of spring 10. Consequently, the unlocking lever 8 is brought to its preparing condition for the next action thereof.

Figure 5:
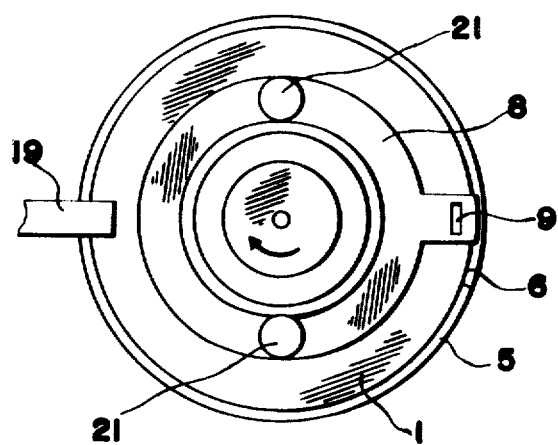
FIGS. 5 – 7 are detailed views which show an operation of the stop device according to second embodiment of the invention.
Figure 6:
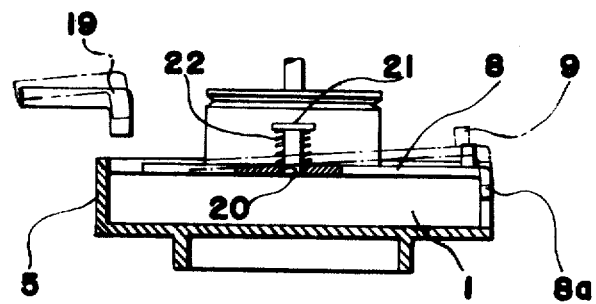
Figure 7:
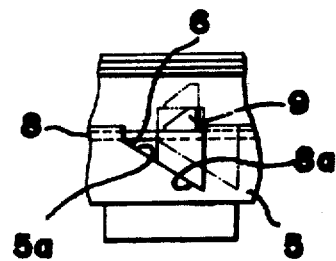

FIGS. 5, 6 and 7 illustrate a modified second embodiment of the invention, in which embodiment protrusion 9 of unlocking lever 8 mounted on the driven rotor 1 has a tapered face 8a formed thereon. The tapered face slidingly abuts on tapered face 5a formed in the sensing wheel 5. The unlocking lever 8 has two holes 20 diametrically situated thereon as seen on FIGS. 5 and 6. Through the holes 20, two pins 21 mounted on the driven rotor 1 extend. Coil springs 22 respectively are placed between an upper face of the unlocking lever 8 and a lower face of a head of the pin 21 in order to press the lever 8 against the driven rotor 1 and keep an abutted condition of the tapered faces 8a and 5a. In this second embodiment, when overload is applied to the sensing wheel 5 due to the stopping of rotation of the reel, the tapered face 5a slides-up along the tapered face 8a so as to raise the unlocking lever 8 and the protrusion 9. In consequence, the raised protrusion 9 strikes the locking member 19 placed in the circular passage of the protrusion in order to unlock the locking member 19.

Figure 8:
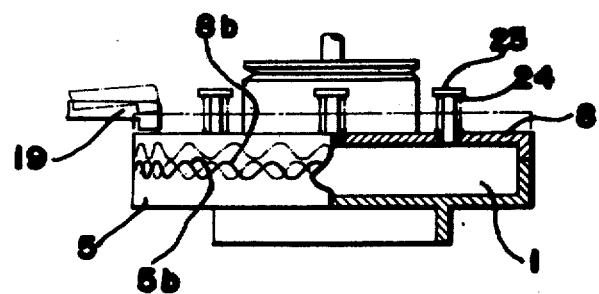
FIG. 8 is a detailed view which shows the device of the third embodiment.

According to the third embodiment of the present invention shown in FIG. 8, the sensing wheel 5 and the unlocking means 8 respectively have a flanged portion or a depending wall and an upright wall. There are corrugations on the circular edge portions of the flanges of the sensing wheel and the unlocking means. The corrugations are engaged with each other and each corrugation is adapted to slide along the mating corrugation. When the sensing wheel or unlocking lever horizontally rotates along the lever or wheel, the sensing wheel 5 placed on the unlocking means 8 displaces vertically along pins 23 mounted on the driven rotor 1. The wheel is pressed downwardly always toward the unlocking means and the driven rotor by means of the coil springs mounted around the pins 23. When overload is applied to the sensing wheel 5 due to a stopping of the reel, an unlocking operation of the unlocking means 8 is carried out as described above.

Figure 9:
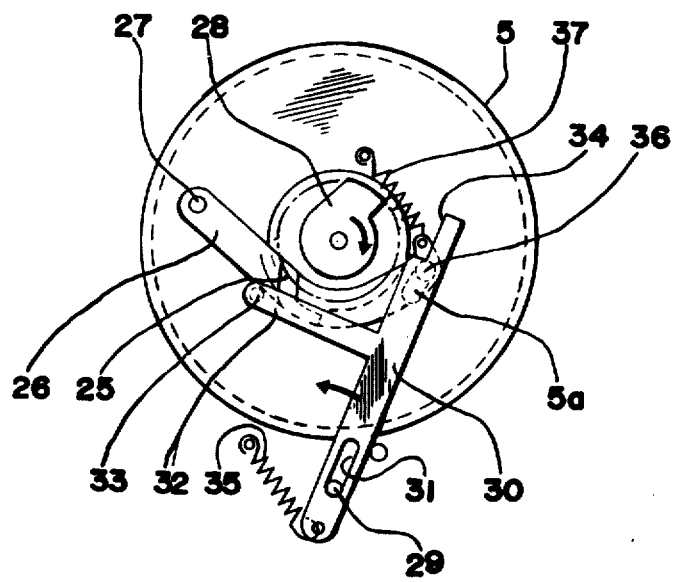
FIGS. 9 – 11 are detailed views which show the operation of the fourth embodiment.
Figure 10:
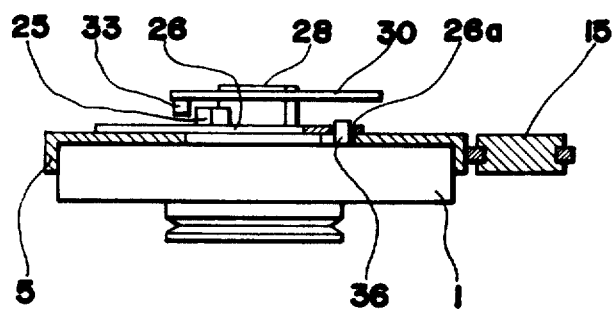
Figure 11:
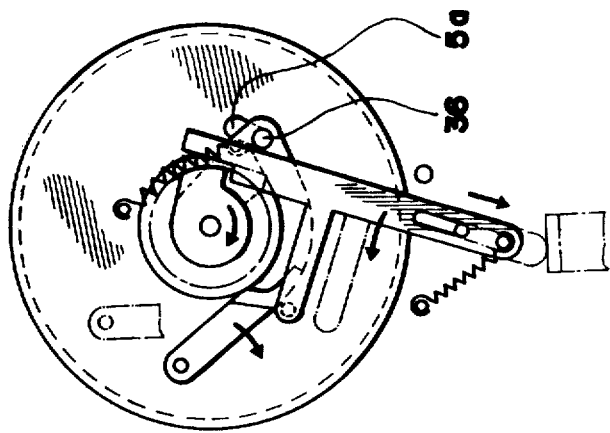

The fourth embodiment of the present invention shown in FIGS. 9, 10 and 11 uses two kinds of levers as an unlocking means in order to increase the stroking distance of the unlocking means. A long hole 31 of a second lever 30 engages a shaft 29 on the machine frame of the tape recorder. An end portion of an arm 32 extending from a mid point of the second lever 30 has a pin 33 which faces to the raised portion 25 and an end portion of the second lever 30 has a stepped portion 34 to be pressed by the cam 28. Owing to a spring 35, the second lever 30 is always swingably biassed so as to more aside.

The operation of the above described mechanism of the fourth embodiment will be appreciated from the following description. While a tape is running or the reel is rotating, the cam 28 formed on the driven rotor 1 and the first lever are integrally moved keeping their positions shown in FIG. 9. In these positions of the cam and lever, the raised portion 25 can not press the pin 33 of the second lever 30, so that the second lever is kept in the position shown in FIG. 9. Now, when overload is applied to the sensing wheel 5 due to the stoppage of the reel, the driven rotor 1 drives the first lever 26 clockwise through the pins 36 and the raised portion 25 advances into a position in which the pin 33 can be pressed by the raised portion. As the pin 33 is pressed, the second lever 30 rotates counterclockwise around a shaft 29 and the stepped portion 34 is moved into a moving passage of the cam 28 as shown in FIG. 11. Then, the cam pushes out the second lever 30 into its position shown by chained lines in FIG. 9. Consequently, the locking means 19 of the unlocking mechanism is unlocked.

Figure 12:
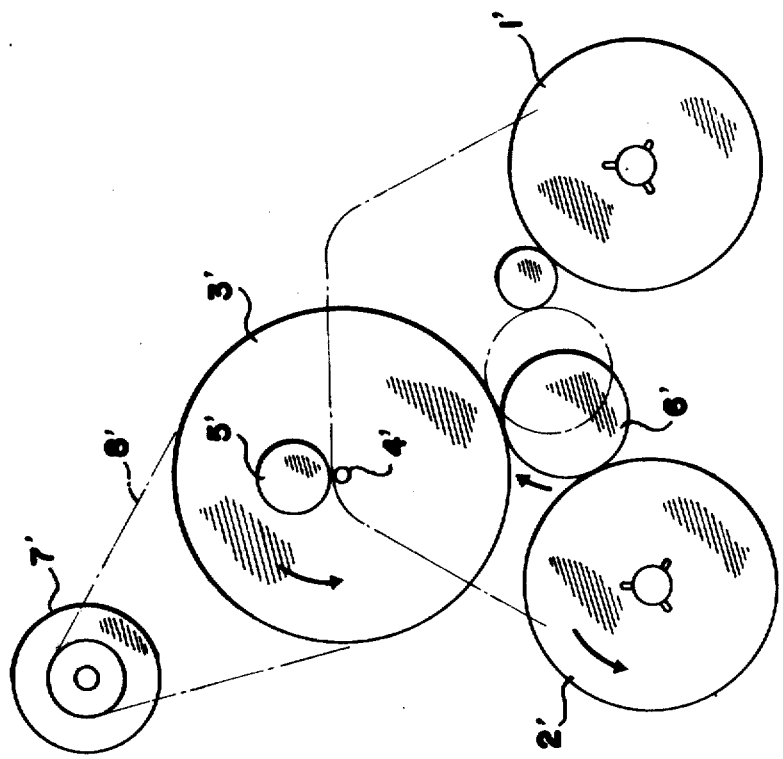
FIG. 12 is an explanatory diagram of a tape recorder having a centrifugal clutch means.
Figure 13:
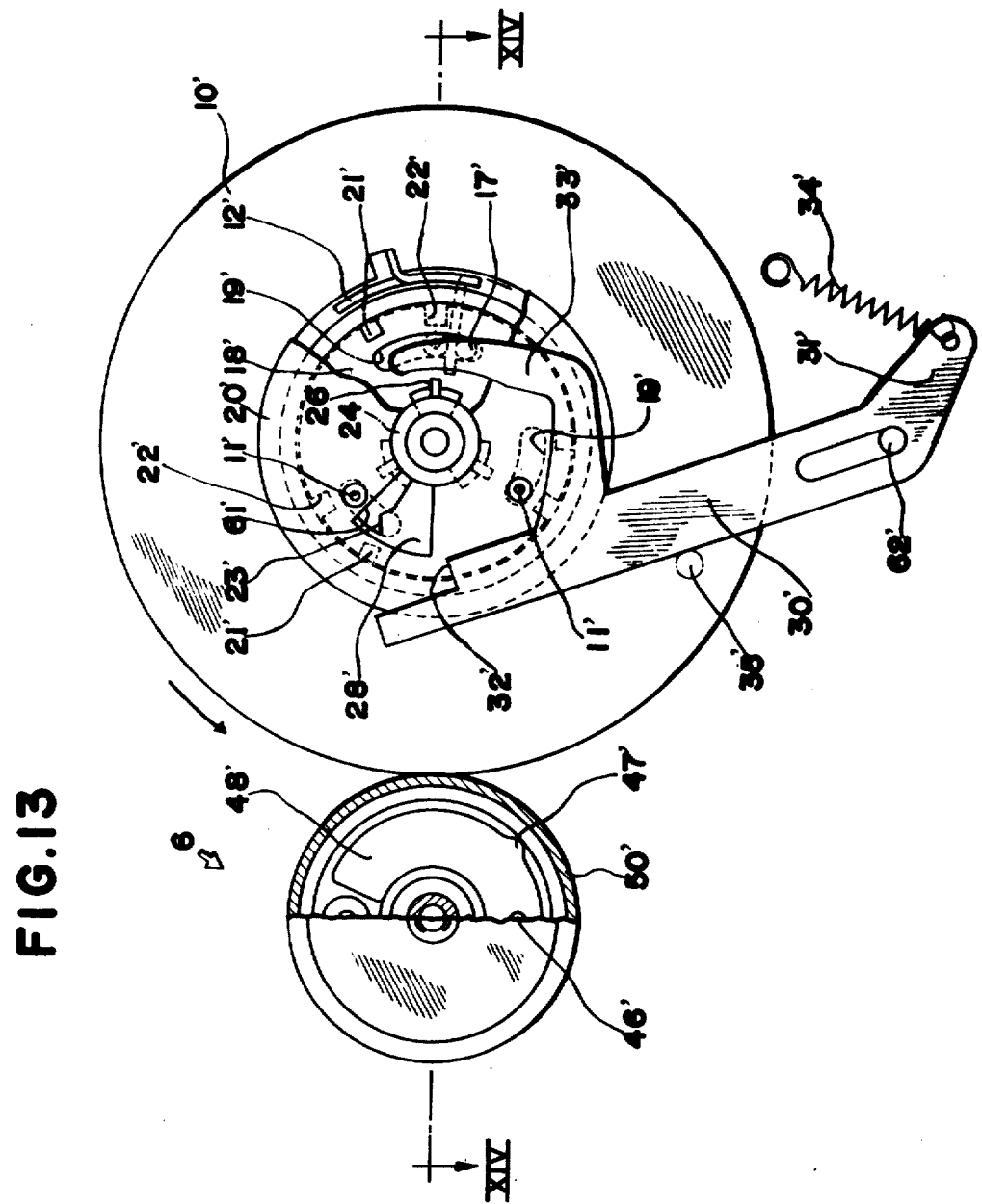
FIG. 13 is a partly cut-off plan view of an automatic stop system.
Figure 14:
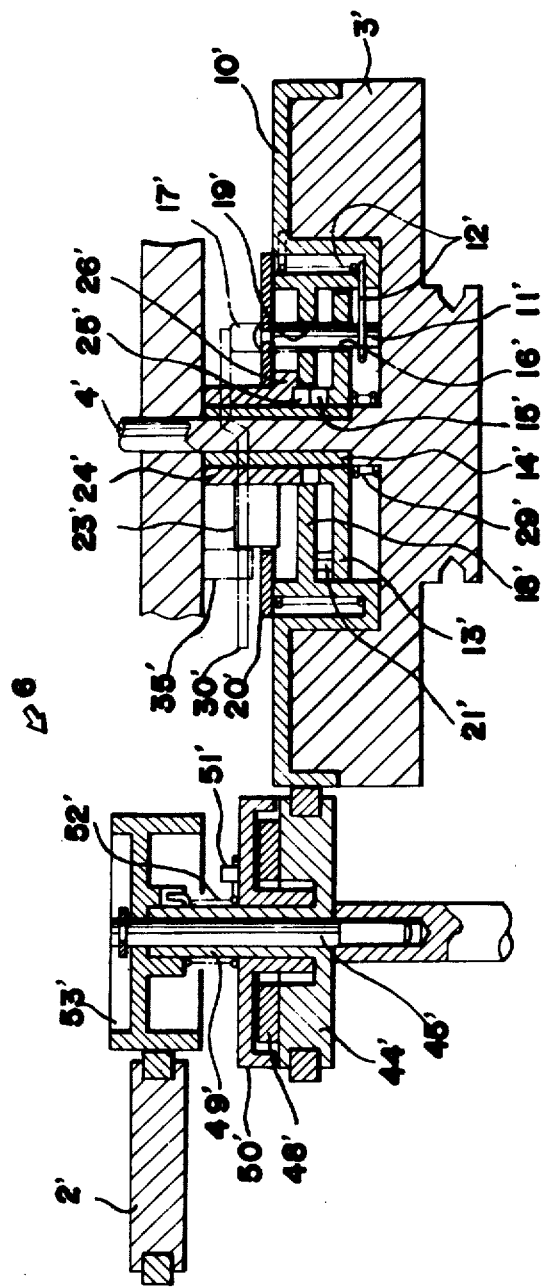
FIG. 14 is a sectional view taken on line XIV—XIV in FIG. 13.

FIGS. 13 – 29 show various embodiments of the automatic stop means and a centrifugal clutch mechanism. The centrifugal clutch mechanism is combined with the automatic stop means in order to effectively operate the stop means when the electric voltage for the motor is considerably reduced. FIG. 12 schematically shows the combination of the automatic stop means and the centrifugal clutch mechanism. In FIG. 12, the reference numerals 1' and 2' are tape reel discs, 3' is a driven rotor of a flywheel having a capstan 4'. 5' is a pinch roller and 6' is a centrifugal clutch mechanism placed between the driven rotor 3' and the reel disc 2'. 7' is a motor for drive of the rotor 3' by a belt 8'. In FIGS. 13 and 14, a sensing wheel 10' is loosely fitted to the driven rotor 3'. A torsion bar spring 12' is used to bias the sensing wheel 10' in a reverse direction of rotation of the driven rotor 3'. The bar spring 12' is engaged with the sensing wheel and poles 11' through the ends of the spring. The number of the poles 11' is determined arbitrarily.

As shown in FIG. 14, an operating plate 13' is mounted around a sleeve 14' which is fitted on a capstan shaft 4'. The operating plate 13' is adapted to rise up and down. On a boss portion of the operating plate 13', a cam 15' is formed. On the face of the operating plate are holes 16' the number of which is the same as that of said poles 11'. The operating plate 13 is guided in its vertical movement by the poles 11' sliding up and down within the holes 16'. The poles are loosely fitted in the holes. Also, a functional pin 17' is eccentrically mounted on the upper face of the operating plate 13'.

The poles 11' pass through long holes 19' and extend out of the holes. The long holes are formed on a wall 18' of the sensing member 10' at equal spacing so as to restrict the rotation of the sensing member 10'. End portions of the poles are fixed to a suppress plate 20'. On the wall 18', several equally spaced engaging protrusions 21' are formed and extend downwardly. Notches 22' having the same number as that of the engaging protrusions 21' are formed on the outer periphery of the operating plate 13'. In ordinary condition, the notches and the engaging protrusions are not overlapped on each other or these positions are not coincided.

A kick-out member 24' is provided having a kicker 23 formed thereon so as to extend horizontally. On an under face of the boss portion of the kick-out member 24', a cam 25' is formed so as to engage with the cam 15' of the operating plate 13'. A plurality of projections 26' are formed around the outer periphery of the end portion of the kick-out member 24' and they frictionally engage with the under face of the suppress plate 20' so that the kick-out member does not rise. A rotation restricting notch 28' is continuously formed at the central hole 27' of the suppress plate 20' and the kicker 23 is removably placed in the restricting notch 28'. An end edge 57' of the restricting notch 28 is adapted to be pressed by the kicker 23'. The operating plate 13' is urged upwardly by means of a coil spring 29' placed between the under face of the operating plate 13' and the driven rotor 3'.

An unlocking member 30' having an end portion 31' adapted to press or operate a locking member (not shown in FIG. 13) for a push button mechanism is mounted so as to pivot around a fulcrum mounted on the machine frame. The unlocking member 30' also has another end portion on which portion a stepped portion 32' is formed and a cam arm 33' extends from a mid-point of the unlocking member 30'. The stepped portion 32' is adapted to engage with the kicker 23' and the cam arm 33' is pressed by the functional pin 17'. The cam arm 33' is urged to pivot toward the operating pin 17 by a spring 34' and the pivotal motion of the arm 33' is restricted by a pin 35'.

The operation of the automatic stop means and the centrifugal clutch mechanism will next be described.

When a tape is completely wound or taken-up from supply reel 1' to take-up reel disc 2' and the reel 2' is stopped, the second rotation communicating wheel 53' of the centrifugal clutch mechanism 6' necessarily is stopped and as a result the first rotation communicating wheel 44' connected to the first wheel 53' through a shaft 45' is stopped. Thus, overload is applied to the sensing wheel 10 rotating integrally with the driven rotor 3 by means of a torsion bar spring 12'. The overload is stronger than the rotation torque of the torsion spring 12', so that further rotation of the driven rotor 3' causes a twist or rotation of the torsion bar spring 12'. As a result, the poles 11' slide within the long holes 19' from one end of the holes to the end thereof, so that the sensing wheel 10' is rotated or moved relative to the driven rotor 3' and the protrusions 21' formed on the sensing wheel 10 coincide with the notches 22' formed on the operating plate 13' in their positions. Consequently, the operating plate 13' is raised by means of coil spring 29' and the functional pin 17' on the operating plate extends so as to push-up the cam arm 33' of the unlocking member 30' (see FIG. 17). Therefore, because of the cam 15' of the operating plate 13' engaging with the cam 25' of the kick-out member 24', the kicker 23' advances to the position as shown in FIG. 17 and the poles 11 push an end edge of a long hole 19' to integrally rotate both the sensing wheel 10' and the driven rotor 3'.

Figure 19:
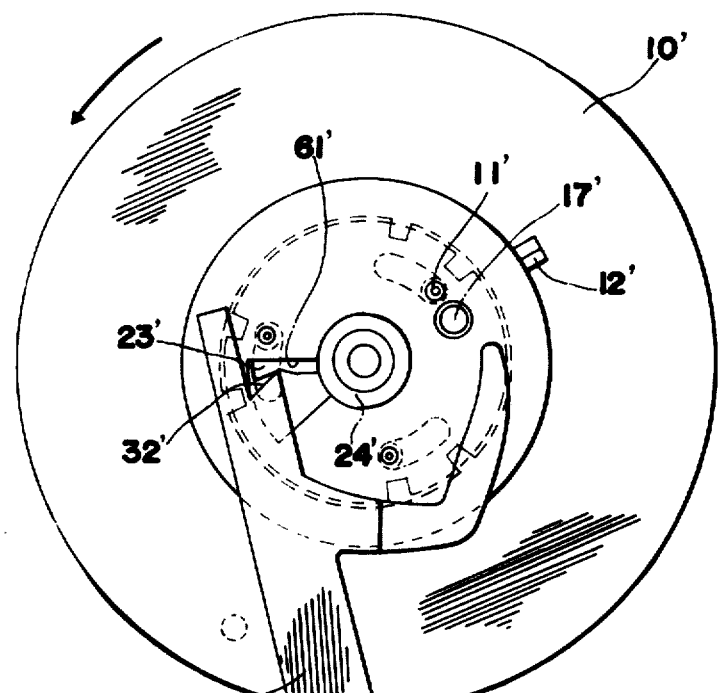
FIGS. 17 – 19 are detailed views which show the operation of the mechanism.
Figure 15:
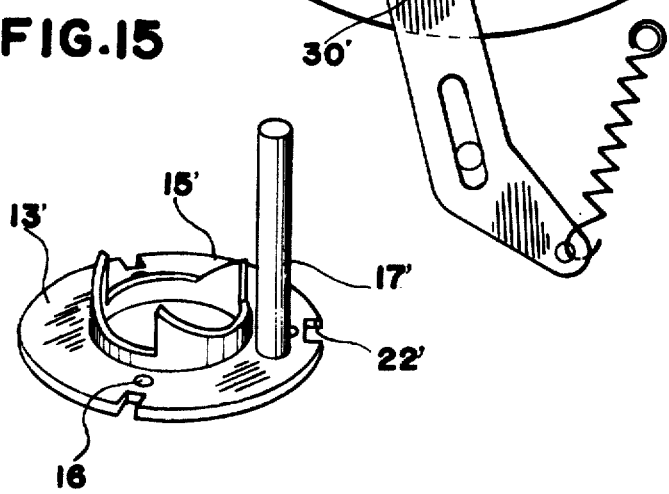
FIGS. 15 and 16 are perspective views of an operating lever and components of the stop mechanism.
Figure 16:
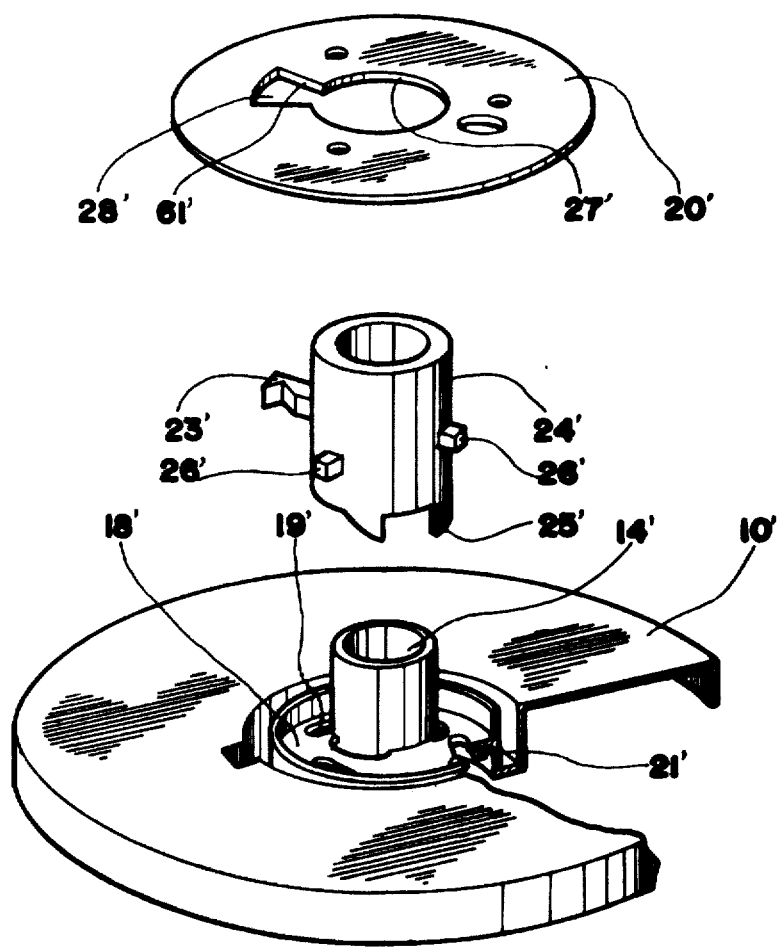
Figure 17:
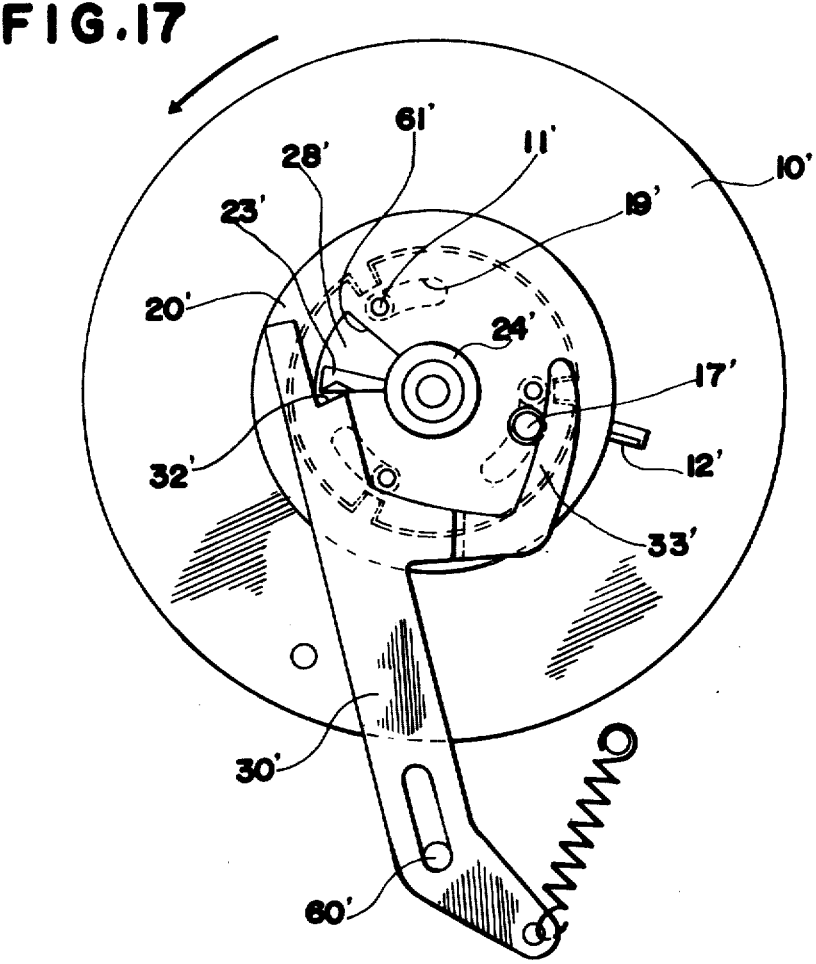
Figure 18:
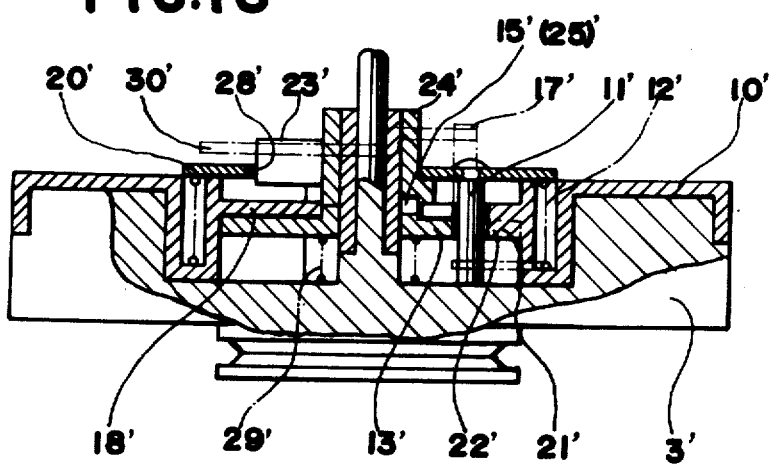
Figure 20:
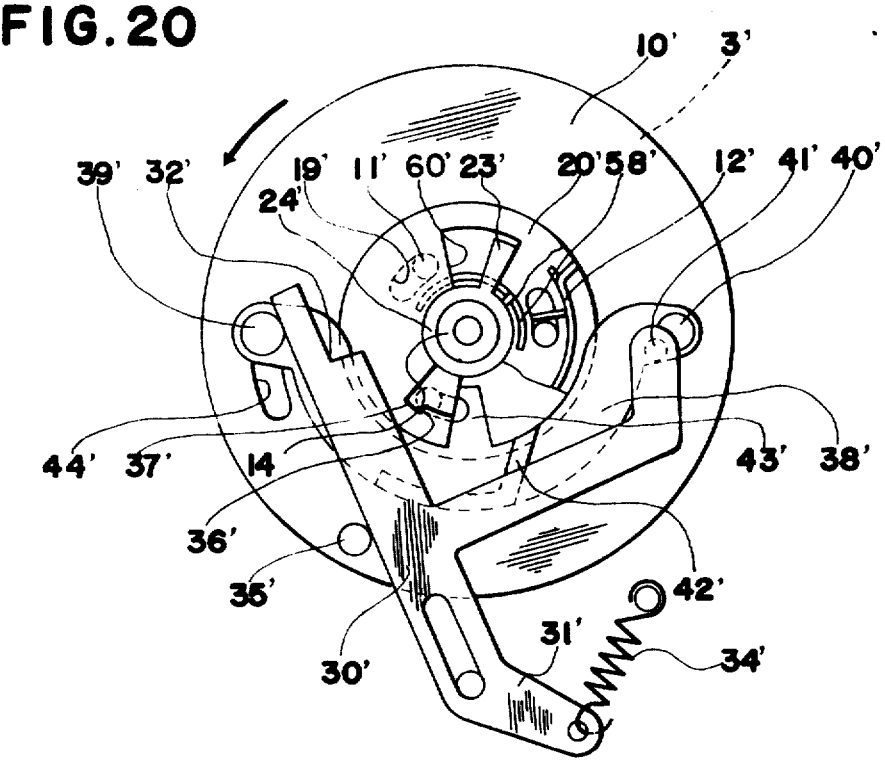
FIGS. 20 – 22 are detailed views which show the operation of the stop mechanism of a modified embodiment of the present invention.
Figure 21:
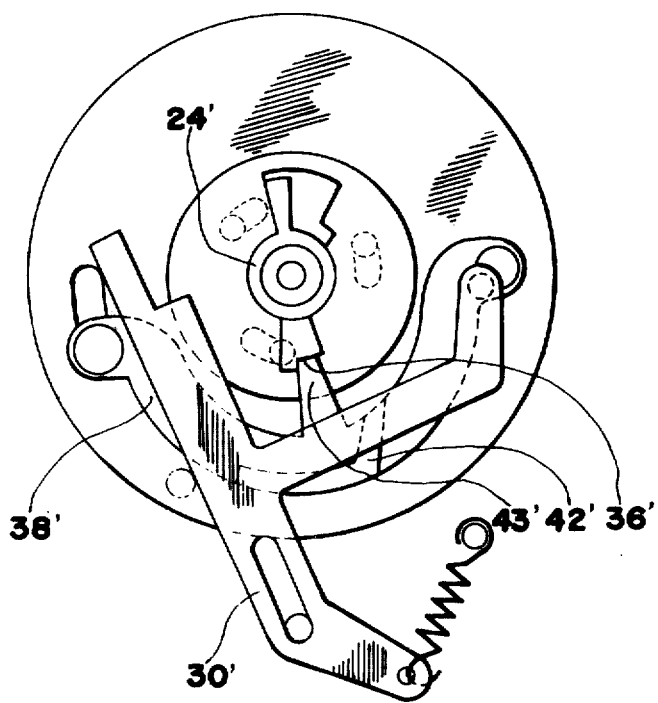
Figure 22:
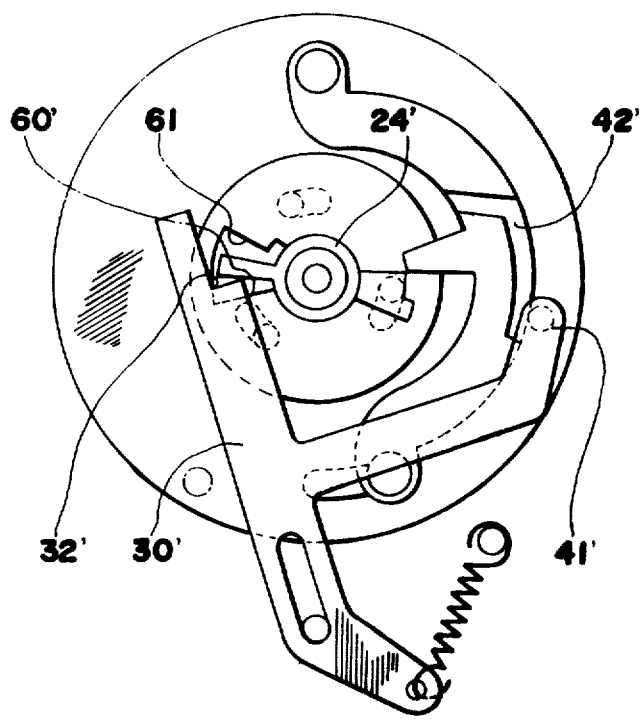
Figure 23:
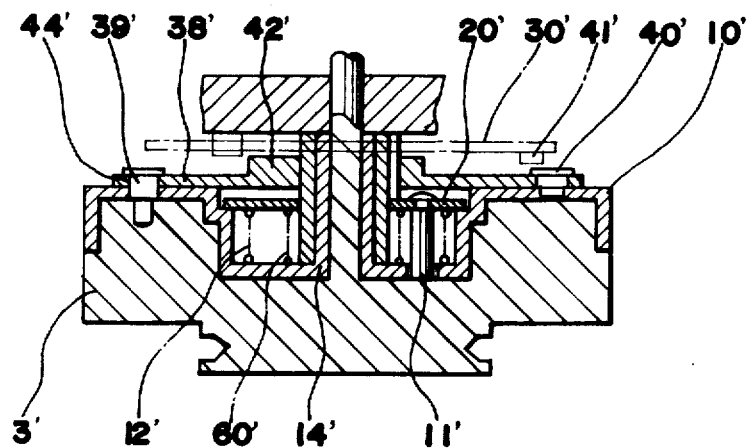
FIGS. 23 and 24 are side sectional views of FIG. 22.
Figure 24:
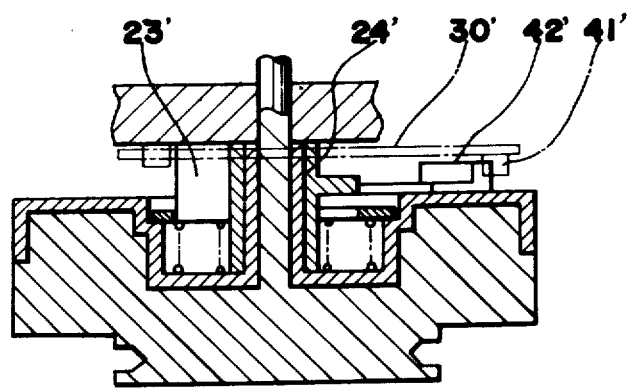

Consequently, the operating pin 17' as seen in FIGS. 17 and 18 the cam arm 33' and the unlocking member 30' is forcibly pivoted around a fulcrum shaft 32', so that the stepped portion 32' of the unlocking member 30' is positioned on the passage of the moving kicker 23'. When the stepped portion 32' engages with the kicker 23' and the suppress plate 20' rotates, the kicker 23' stops its rotational motion and the kicker 23' moves from one side to the other side of a fan-like opening 28'. In consequence, the cam 25' of the kick-out member 24' presses down the operating plate 13' through the cam 15' formed on the operating plate 13'. During the pressing down of the operating plate 13', the protrusions 21' of the sensing wheel 3' are separated from the engaging notches 22' of the operating plate 13'. In consequence, the sensing wheel 10' is returned to its original position due to the restoring force of the twisted torsion spring 12'. Then, the unlocking member 30' is pushed as shown in FIG. 19 by means of the kicker 23' strongly pushed through a side 61' of the fan-like opening 28' toward the stepped portion 32' of the unlocking member 30', whereby the driving motor 7' is stopped.

The seventh embodiment of the automatic stop mechanism is shown in FIGS. 20 - 24. In this embodiment, the kick-out member 24' having a kicker 23' and a projection 37' provided with an engaging stepped portion 36' is loosely fitted on a sleeve 14' formed integrally with the sensing wheel 10'. A torsion bar spring 12', one end of which is secured to the driven rotor 3' and the other end of which to the kick-out member 24' is used in order to develop a rotational force the direction of which is the same as that of the driven rotor 3' in the kick-out member 24'.

According to a feature of the seventh embodiment of this invention, the operating member 38' has characteristically a semicircular shape in plan, an end of the semicircular operating member 38' being secured to a supporting pin 39' on the driven rotor 3' and the other end being secured to a fulcrum pin 40' on the sensing wheel 10'. The supporting pin 39' slides along a long and curved hole or opening 44 formed on the sensing wheel 10'.

On a face of the operating member 38', are formed at its mid point a raised cam 42' engaging with a pin 41' of an end of the cam arm 33' and a projection 43' engaging with the projection 37'. During a normal condition of the mechanism, a front side of the projection 37' is pressed against a side of the projection 43' by means of the torsion bar spring 12' (see FIG. 20).

When load is applied to the sensing wheel 10' owing to a stopping of the centrifugal clutch mechanism 6' and a difference of rotation angle between the sensing wheel 10' and the driven rotor 3' is made so as to move the operating member 38' as seen in FIG. 10, the projection 43' on the operating member 38' and also the kick-out member 24' rotate counterclockwise. Then, the projection 43 is engaged with the stepped portion 36' formed on the projection 37' (see FIG. 21). The operating member 38' does not move any more until it is moved by the unlocking member or lever 30' even if the load applied to the sensing wheel 10' disappears. Next, the operating member 38' rotates along with the driven rotor 3' and the raised cam 42' formed on the operating member engages with the pin 41' of the unlocking member 30' so as to pivot the member 30'. Therefore, the kicker 23' engages and pushes an end stepped portion 32'. When the driven rotor 3' continues its rotation, the kick-out member 24' rotates relative to the driven rotor 3' and the sensing wheel 10', so that the projection 43' disengages from the projection 37' and a side 60' of the opening 28' engages with the kicker 23'. As a result, the kicker kicks-out the unlocking lever 30' in order to unlock the locking mechanism for the push-button of a tape recorder. Just after the kicking-out, the sensing wheel 10' returns to the original position by means of the torsion bar spring 12'.

When the unlocking member 30' is kicked out by the rotational force of the driven rotor 3', the load of the centrifugal clutch mechanism 6' is loaded already on the driven rotor 3', so that the rotation speed thereof is lowered. Also, the voltage of the electric source of the tape recorder often drops for various reasons and the rotation speed of the driven rotor 3' is lowered.

In order to prevent the rotational speed of the driven rotor from being lowered and to effectively operate the unlocking lever, the present invention provides a novel clutch means with the automatic stop means including the driven rotor, the sensing wheel and the unlocking lever.

FIGS. 14 - 29 illustrate various embodiments of the novel clutch means. As apparent from the illustration of FIG. 29, the clutch means uses the centrifugal force of two weights 48' respectively having a bulging. The weights are swingably mounted on the communicating wheel 44' by pivots 46' so as to swing and open, so that the bulgings 47' slide on a depending circular wall of the drum 50' which is loosely fitted on a central sleeve 49' of the communicating wheel 44'. A torsion coil spring 52' is placed around the central sleeve 49' leaving a diametrical space between them. An end portion of the coil spring is secured to a securing pin 51' on an upper face of the drum 50' and the other end portion of the spring to the second communicating wheel 53 contacting with a tape reel. The torsion coil spring 52' is adapted to become tight when the first communicating wheel 44 rotates in its ordinary rotational direction.

According to the prior art centrifugal clutch mechanisms, when some load higher than the predetermined one is applied to one wheel (for example, the second wheel 53') of the mechanism, the loaded wheel slips relative to the other wheel (for example, the first wheel 44'). Consequently, the load of the second communicating wheel 53' is applied to the sensing wheel 10' and the driven rotor 3' until the unlocking member 30 completely unlocks the push button. Accordingly the rotational force of the driven rotor is made too small to effectively operate the unlocking member.

The operation of the novel mechanism of the invention to resolve the conventional disadvantages will be described hereafter. First, when the rotational speed of the first communicating wheel 44' reaches a predetermined value, the wheel 44' is driven by the driven rotor 3' through the sensing wheel 10', the weights 48' are centrifugally opened or separated from each other and thus the drum 50' is given a rotation torque through engaging of the bulgings 47' and the torsion spring is twisted tightly. As the spring 52' is most tightly twisted, the rotational force of the first wheel 44' is communicated to the second wheel 53' and the tape reel.

Reversely, when overload is applied to the second communicating wheel 53' as a winding of the tape around a reel of a set of tape reels is finished and the reel contacting the second wheel 53' is stopped, the first and second communicating wheels are decreased in their rotational speed, the centrifugal operation of the weights is ceased and the tightness of the torsion coil spring 52' disappears. During the very short time of disappearing of the tightness of the spring, no-load is applied to the first communicating wheel 44', that is, the wheel is brought to its freely rotatable condition. As a result, the driven rotor 3' frictionally contacting with the freely rotatable wheel 44' remains at its no-load condition instantaneously. The rotational speed of the driven rotor 3' is sharply increased and the unlocking member 30 is firmly kicked out.

Referring to FIG. 14 illustrating a second embodiment of the centrifugal clutch mechanism 6', the mechanism includes two torsion coil springs 52' and 54'. The individual lower end portions of the coil springs are secured to a spring mount 55' formed on an end face of the boss of the drum 50' and a spring securing notch 56' of a plurality of rack teeth formed on the drum and the individual upper end portions are secured to the under face of the second communicating wheel 53'.

The rotational torque of the first or second communicating wheel is easily controlled by selecting the suitable notch 56' and securing the end portion of the coil spring 54' to the suitable notch.

According to the third embodiment of the centrifugal clutch mechanism 6', a sleeve 57' is loosely inserted into a cylindrical boss portion extending upwardly from the drum 50' and integrally connected to the first communicating wheel 44'. Around the sleeve 57', a torsion coil spring 52' is placed one end of which is secured to the cylindrical boss portion and the other end secured to the second communicating wheel 53' (see FIG. 26).

Figure 27:
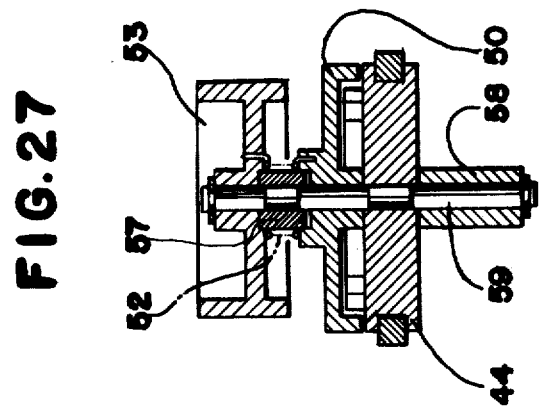
Figure 29:
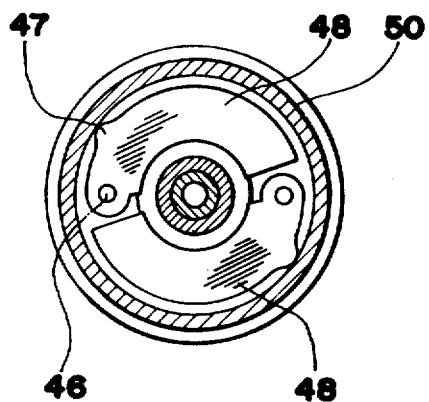
FIGS. 28 and 29 are sectional views taken along lines XXVIII—XXVIII and XXIX—XXIX respectively in FIG. 25.
Figure 28:
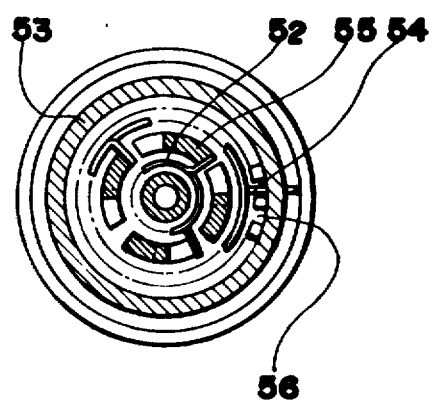

The fourth embodiment of the centrifugal clutch mechanism 6' is shown in FIG. 27 in which a rotation shaft 59' is supported by a bearing 58'. On the shaft 59', only the first rotation communicating wheel 44' and a sleeve 57 are secured and between them, the drum 50' is placed and loosely mounted on the shaft 59'.

Figure 25:
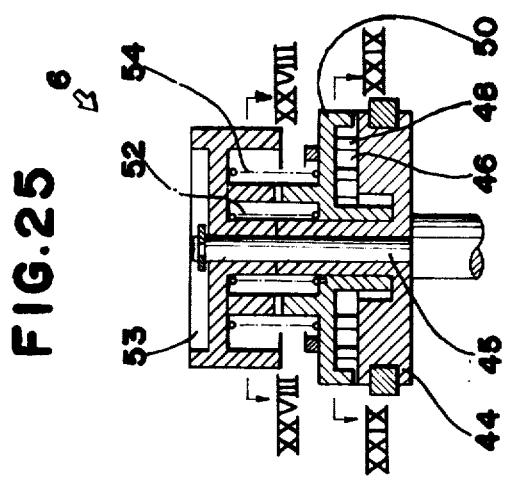
FIGS. 25 – 27 are sectional views of various embodiments of the centrifugal clutch device of the present invention.
Figure 26:
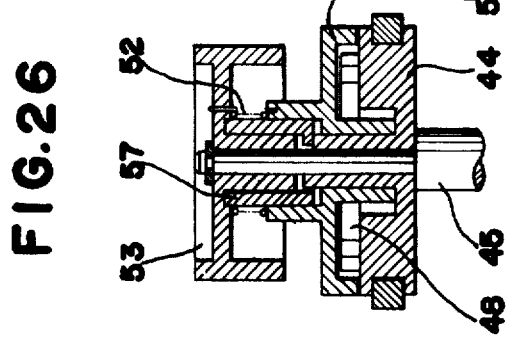

In spite of the fact that shaft 45' is not made to be rotated and the first and second communicating wheels and the sensing wheel are loosely or rotatably fitted to the shaft 45' of the embodiments shown in FIGS. 25 and 26, the first and second communicating wheels of the embodiment shown in FIG. 27 are firmly secured to the rotatable shaft 59.

In order to further improve the centrifugal clutching operation of the clutch mechanism according to the present invention, a centrifugal clutch is adapted to limit its rotation speed at which the clutch mechanism works. According to the various clutch mechanisms shown in FIGS. 25 – 29, when the clutching operation of the clutch mechanism is carried out, that is, the automatic stop means including the driven rotor and sensing wheel and the tape reel are connected through the centrifugal clutch mechanism, the loads of the reel, the clutch mechanism and the automatic stop means are imposed on the drive motor, so that the rotation speed of the motor is lowered. Consequently, the weights of the clutch mechanism are closed so as to cut the rotation connection between the tape reel and the driven rotor of the automatic stop means.

The improved centrifugal clutch mechanism shown in FIGS. 30 – 33 have a control member or weight A and an engaging clutch B. The mechanism is attached to the machine frame 1'' through a rotation shaft 2'' in the frame. A driven wheel 3'' is secured to the shaft 2'' and driven by a flywheel 4'' contacting the driven wheel. The flywheel is driven by the motor.

The weight A and clutch B respectively are closably or swingably attached to the driven wheel 3'' by means of pins 7'', 8'' inserted into sleeves 5'', 6''. The sleeves 5'', 6'' are embedded in the weight A and clutch B at the end portions of them. The weight A and clutch B are urged inwardly by means of coil springs 9'' mounted around the pins 7'', 8''.

The engaging clutch B has a raised portion 10'', a depending pin 11' and a pair of engaging faces 12'' and 13''. The control member A has an engaging face 14''.

Preferably the clutch B is set to rotate the driven wheel 3'' at about 750 rpm and the control member A is set at about 1000 rpm.

Preferably the clutch B is set so as to operate as the driven wheel 3'' rotates at about 750 rpm and the control member A is set at about 1000 rpm. Therefore, when the driven wheel 3'' rotates at a speed lower than 750 rpm, the end faces 12'' and 14'' are engaged with each other and the clutch B does not move. A movement of the control member A is limited by means of an abutment pin 15'' on the driven wheel 3''.

Figure 30:
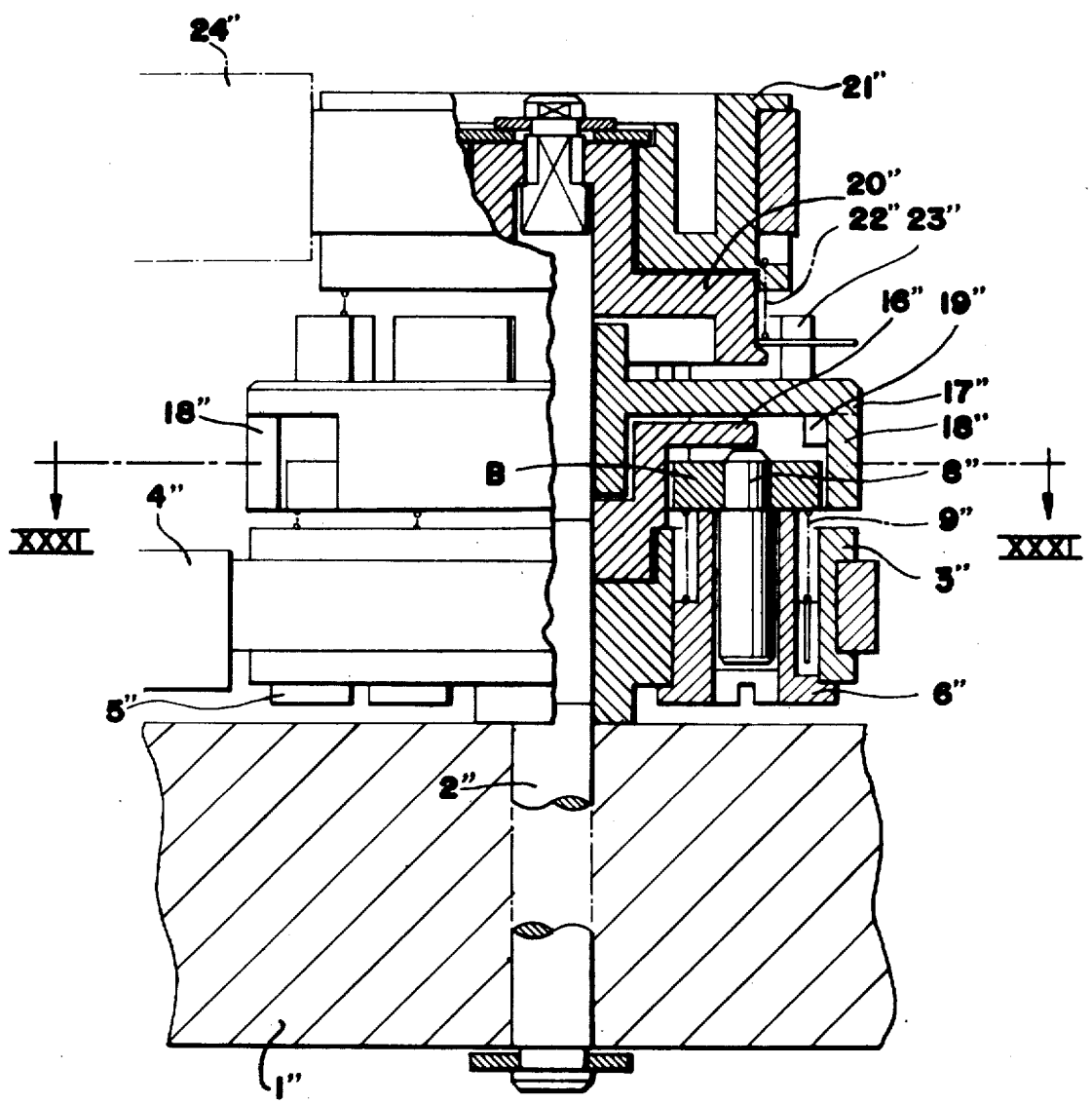
FIG. 30 is a side elevational view partly shown broken away in section of an idler of the present invention incorporating a centrifugal clutch mechanism thereon.
Figure 31:
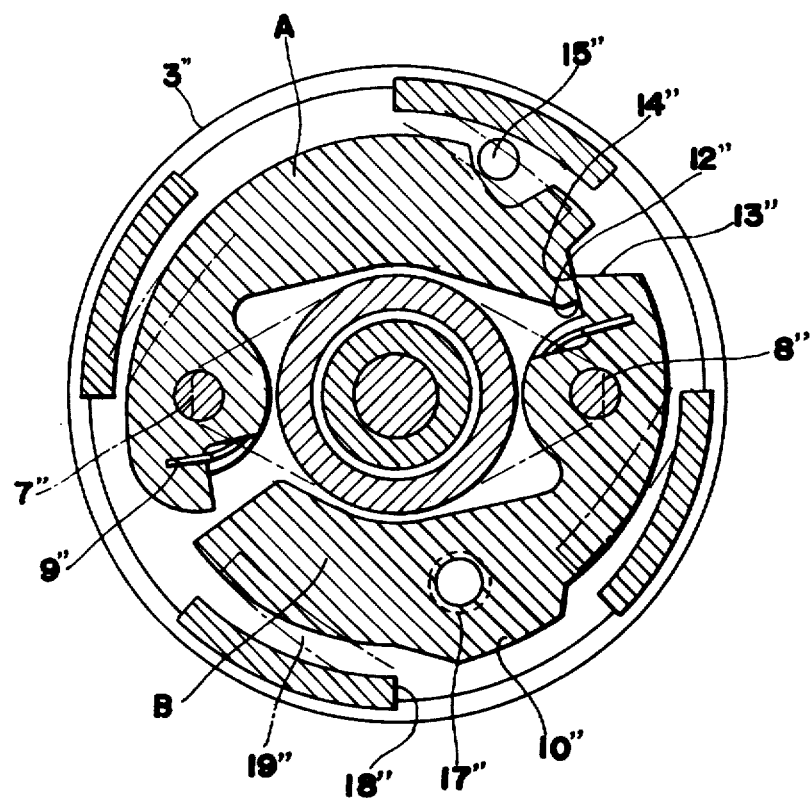
FIG. 31 is a sectional view taken along line XXXI-—XXXI in FIG. 30.

As shown in FIG. 30, the control member A and clutch B are prevented from slipping out of their positions by means of a preventor 16'' fitted into the driven wheel 3''.

The member A and the clutch B are covered by a drum 17'' having a circular depending wall, on which a clutching portion 18 for engaging with the raised portion 10'' and a guiding portion 19'' for the pin 11''.

A brake drum 20'' is secured to the shaft 2'' and a rotation communicating wheel 21'' is rotatably fitted on the drum 20''. A torsion coil spring 22'' is loosely fitted around the drum 20'', one end of which is secured to the drum and the other being secured to a notch 23'' upwardly extending at points of equal distances, whereby rotation of the drum 17'' is transferred to the wheel 21'' contacting with a tape reel 24''.

Of course, the rotation of the driven wheel 3'' is transferred to the flywheel 4'' in order to unlock the locking means, for example, of a push button.

The operation and function of the centrifugal clutch mechanism will now be described. When the motor-driven flywheel 4'' drives the driven wheel 3'' at a speed higher than 1000 rpm, the clutch B is disengaged from the member A. Thus, the reel is driven. When the rotation communicating wheel 21'' is loaded, the torsion coil spring 22'' is tightly twisted and the rotation speed of the drum 17'' is lowered, so that the clutch B is disengaged from the drum 17'' and the wheel 3'' is made no-load.

Advantageously, the rotation inertia of the flywheel is not diminished or a sufficient force for effectively operating the unlocking means is obtained.

According to the centrifugal clutch means shown in FIGS. 30 – 33, a rotational force of the driven wheel is not transferred to a rotation communicating wheel of the centrifugal clutch mechanism until the rotation speed of the driven wheel does not reach, for example, 1000 rpm. Consequently, the centrifugal clutch mechanism rotates or operates effectively and the reliability of the mechanism is made high.

It is further understood by those skilled in the art that the foregoing description is of preferred embodiments of the disclosed mechanism and that various changes and modifications may be made in the invention without departing from the spirit and scope thereof.

What is claimed is:

1. Automatic stop mechanism for an electronic tape apparatus, comprising a driven rotor, sensing means mounted on said driven rotor in co-axial relation thereto, a reel disc on which a tape reel of a tape cassette can be mounted, said sensing means being in operative contact with said reel disc, operating means operating coupling said driven rotor and said sensing means and permitting relative angular rotation, said operating means including a projection, said operating means normally causing said sensing means to rotate with said driven rotor and, upon completion of a tape winding operation, a braking force due to the tensile force exerted from the tape is applied to the reel disc which in turn applies the braking force to said sensing means to produce relative angular rotation between said driven rotor and said sensing means, said projection of said operating means being projected out of said sensing means upon said relative angular rotation for operating an unlocking mechanism for a locking means keeping the tape-running condition.

2. Apparatus stop mechanism according to claim 1, wherein said driven rotor is a flywheel.

3. Automatic stop mechanism according to claim 1, comprising an idler pulley in circumferential contact with said disc and sensing means, said reel disc being operated from said sensing means through said idler pulley.

4. Automatic stop mechanism according to claim 3, comprising a centrifugal clutch means coupled to said idler pulley.

5. Automatic stop mechanism according to claim 1, wherein said driven rotor has a central cavity in which said operating means is contained.

6. Automatic stop mechanism according to claim 1, wherein said sensing means has a central cavity in which the operating means is contained.

7. Automatic stop mechanism according to claim 1, wherein said operating means includes return means for retracting said projection from its projected position to its original position.

* * * * *